US006318591B1

(12) United States Patent
Martin

(10) Patent No.: US 6,318,591 B1
(45) Date of Patent: Nov. 20, 2001

(54) DISPENSING MACHINE FOR PRINTED PUBLICATIONS

(75) Inventor: Chris Martin, Empire, MI (US)

(73) Assignee: DPC International, Inc., Dublin (IE)

( * ) Notice: Subject to any disclaimer, the term of this patent is extended or adjusted under 35 U.S.C. 154(b) by 0 days.

(21) Appl. No.: 09/559,848

(22) Filed: Apr. 27, 2000

(51) Int. Cl.[7] .................... B65G 59/00

(52) U.S. Cl. .................... 221/258; 221/226; 221/279; 221/280

(58) Field of Search .................... 221/191, 258, 221/249, 279, 280, 226; 414/798.9

(56) References Cited

U.S. PATENT DOCUMENTS

| | | | |
|---|---|---|---|
| 187,252 | 2/1877 | Brice . | |
| 2,137,490 | 11/1938 | Harvey | 312/57 |
| 2,371,316 | 3/1945 | Rice et al. | 312/97.1 |
| 2,546,352 | 3/1951 | Weaver | 312/94 |
| 2,800,251 | 7/1957 | Abendschein | 221/211 |
| 2,876,884 | 2/1955 | Ray | 194/10 |
| 3,685,691 | 8/1972 | Charest et al. | 221/225 |
| 3,747,733 | 7/1973 | Knickerbocker | 194/10 |
| 3,908,859 | 9/1975 | Hohmann | 221/118 |
| 4,061,245 | 12/1977 | Lotspeich | 221/75 |
| 4,067,477 | 1/1978 | Chalabian | 221/1 |
| 4,131,213 | 12/1978 | Tamura et al. | 221/14 |
| 4,298,140 | 11/1981 | Owens | 221/232 |
| 4,312,461 | 1/1982 | Godley, Sr. | 221/195 |
| 4,331,261 | 5/1982 | Brown | 221/232 |
| 4,367,826 | 1/1983 | Glaser | 221/213 |
| 4,473,172 | 9/1984 | Reynolds | 221/213 |
| 4,501,379 | 2/1985 | Halone et al. | 221/221 |
| 4,506,800 | 3/1985 | Wingate | 221/6 |
| 4,527,711 | 7/1985 | Harrell | 221/244 |
| 4,566,581 | 1/1986 | Martin | 194/248 |
| 4,651,896 | 3/1987 | Harrell | 221/229 |
| 4,700,869 | 10/1987 | Bogner | 221/249 |
| 4,770,321 | 9/1988 | Anderson | 221/100 |
| 4,821,916 | 4/1989 | Dewaele | 221/13 |
| 5,067,605 | 11/1991 | Gordon | 221/227 |
| 5,165,571 | 11/1992 | Schlumpf | 221/213 |
| 5,199,599 | 4/1993 | Shade | 221/226 |
| 5,209,336 | 5/1993 | Heltzen et al. | 194/248 |
| 5,305,913 | 4/1994 | Shade | 221/226 |
| 5,373,963 | 12/1994 | Hsu | 221/17 |
| 5,400,919 | 3/1995 | Gomm | 221/195 |
| 5,431,300 | 7/1995 | Kahanek et al. | 221/151 |
| 5,439,136 | 8/1995 | Chatani et al. | 221/258 |

(List continued on next page.)

FOREIGN PATENT DOCUMENTS

| | | |
|---|---|---|
| 2117786 | 10/1972 | (DE) . |
| 2437648 | 2/1976 | (DE) . |
| 1285942 | 10/1980 | (DE) . |
| 0581076 | 3/1994 | (EP) . |
| 0685827 | 12/1995 | (EP) . |
| 9012377 | 10/1980 | (WO) . |

*Primary Examiner*—Christopher P. Ellis
*Assistant Examiner*—Michael E Butler
(74) *Attorney, Agent, or Firm*—Keaty Professional Law Corporation

(57) ABSTRACT

The invention relates to a dispensing machine for printed publications. The vending machine allows to dispense one copy at a time by providing a metering break next to a dispensing channel. The vending machine has a hollow housing, within which a detachable module is slidably mounted. An operational portion of the machine includes a motor controlled by a microchip that constantly adjusts the speed of the motor depending on the thickness of the dispensed publication. A paper speed sensor sends a signal to the motor to facilitate adjustment in the speed control. Printed publications rest in an upright position on moving endless belts that are connected to the motor for advancing the publications toward the dispensing channel. One or more torsion springs support the front face of the forwardmost publication immediately prior to dispensing to prevent premature opening of an unfolded edge of the publication and jamming of the dispensing channel.

20 Claims, 4 Drawing Sheets

U.S. PATENT DOCUMENTS

| | | | | |
|---|---|---|---|---|
| 5,482,184 | | 1/1996 | Chang | 221/259 |
| 5,553,738 | | 9/1996 | Roselli | 221/195 |
| 5,709,315 | * | 1/1998 | Kahler et al. | 221/155 |
| 5,791,511 | | 8/1998 | Lowing | 221/614 |
| 5,813,568 | | 9/1998 | Lowing | 221/614 |
| 5,921,436 | | 7/1999 | Lowing | 221/279 |
| 5,954,227 | * | 9/1999 | Moore et al. | 221/103 |
| 5,996,840 | | 12/1999 | Serduke | 221/210 |
| 6,003,725 | * | 12/1999 | Blankenau et al. | 221/195 |
| 6,112,941 | * | 9/2000 | Wenner | 221/213 |
| 6,135,315 | * | 10/2000 | Gremillion, III et al. | 221/259 |
| 6,230,932 | * | 5/2001 | Lowing et al. | 221/280 |

* cited by examiner

DISPENSING MACHINE FOR PRINTED PUBLICATIONS

BACKGROUND OF THE INVENTION

The present invention relates to dispensing machines for printed publications, and more particularly to a machine suitable for vending of newspapers, magazines and the like.

Newspaper and magazine vending machines are conventionally placed in high traffic areas to maximize exposure of the publication to the public. The preferred locations are bus stops, lobbies of public buildings, busy street corners and the like. As a general rule, the newspapers and magazines are stacked in a hollow housing, which is provided with a coin box for receipt of payment from the public.

Once the necessary amount has been deposited, the buyer pulls the front door of the vending machine open and withdraws one copy from the stack of newspapers or magazines positioned in the housing. However, such machines allow access to the entire inventory positioned in the vending machine, without any restrictions as to the number of copies a purchaser retrieves. In some cases, theft of newspapers caused substantial losses to the vending machine owner/operator.

To prevent such losses, the industry realized a need for a dispensing machine that would allow to separate one copy of such publication from the supply of publications in the vending machine and dispense only one copy at a time. Some of known solutions is to use a ratchet mechanism that pulls out one copy of vertically positioned papers and carries them to the dispensing channel. Other approaches use a conveyor-type endless belt or belts for carrying one copy to the dispensing channel.

While such designs can work satisfactory in some environments, there is still a need for a simple to operate, inexpensive dispensing mechanism capable of carefully metering the number of copies removed from the inventory, so as to dispense only one copy at a time.

An additional consideration is the difference in thickness of daily newspapers as compared to Sunday papers. Conventionally, Sunday papers have considerably more pages, advertising inserts, which increase the fold thickness of the newspaper to one inch or more. It is preferred that the vending machine be capable of dispensing different thickness papers without major adjustments by an operator.

The patents and application listed above disclose dispensing machines with upwardly inclined ramps, along which newspapers are pushed to a dispensing opening. In these machines, the newspapers are aligned vertically, with a fold of a newspaper resting on the bearing surface of the ramp and unfolded edges of the papers facing upwardly.

When advertising inserts are included between sections of the newspaper, the single fold becomes thicker than the unfolded edge. Newspaper, being printed on relatively thin paper, has little vertical stiffness, which causes the paper to "sag" on the ramp. An upwardly oriented push plate helps keep the newspapers in a generally vertical orientation as they are dispensed, one by one, due to the provision of a metering brake adjacent the dispensing opening.

In such machines, the ramp surface is intentionally made smooth to prevent damage to newspapers and use as little of battery power as possible. Still, when the newspaper is particularly voluminous a careful balance must be worked out between a high coefficient of static friction while maintaining a low coefficient of sliding friction. This balance will help in preventing newspapers from sagging and slipping over the metering brake.

Another problem that was encountered during testing is tendency of Sunday edition papers to "fall apart" or open during vending due to a large number of inserts and advertising sections. It was discovered that the amount of pressure applied to the front face of the newspapers affects the performance of the dispensing machine. Daily papers, for example, need little pressure to be neatly dispensed, while Sunday papers require greater amount of pressure. The present invention contemplates elimination of drawbacks associated with the prior art and provision of a dispensing machine for printed publications that is automatically adjustable for the speed of dispensing, the amount of pressure on the front face of the newspaper and that almost eliminates "pushing" action of the push plate, thus reducing friction of the newspaper moving up the ramp.

SUMMARY OF THE INVENTION

It is, therefore, an object of the present invention to provide a dispensing machine for printed publications that can dispense one copy of the publication at a time.

It is another object of the present invention to provide a dispensing machine for printed publications that is easy to operate and inexpensive to manufacture.

A further object of the invention is to provide a dispensing machine that can be easily adjusted to various thickness papers without the need for daily adjustments by an operator.

It is still a further object of the present invention to provide a newspaper vending machine that reduces friction of movement of a newspaper along an upwardly inclined ramp thus preventing damage to the newspaper.

It is still a further object of the present invention to provide a vending machine for newspapers and similar printed publications that has a means for applying pressure on the front face of the publication during vending and prevents premature opening of the publication.

These and other objects of the invention are achieved through a provision of a dispensing machine that comprises a hollow housing and a detachable module slidably mounted in the housing. The module can be easily disengaged from the housing and sent for maintenance and repairs, while another similar module is positioned in the same housing.

The support pedestal is adjustable in height since the two parts of the pedestal telescopically move up and down. The operating mechanism is located in the module. The operating mechanism comprises a two-part bearing plate, on which the printed publications, such as newspapers, are supported. Each bearing plate assembly is provided with an endless belt that carries the folded edge of the newspaper towards a dispensing channel. The belts are connected to a motor through spur and pulley arrangements.

A push plate helps to keep the newspapers in an upright position and advance the papers towards a dispensing channel. To prevent the unfolded edge of the newspaper from "opening up" and jamming the dispensing channel during the vending cycle, a "tension" window is provided.

The tension window comprises a pair of torsion springs mounted in the housing above the bearing plate assemblies. One of the springs is always in operation, it supports the front face of the forwardmost paper, extending across the entire width of the page. The second, auxiliary spring is pivoted to extend in the paper path when the publication is particularly voluminous, such as Sunday newspaper. Normally, it is outside of the paper path, above the uppermost edge of the paper.

A microchip with a clock is connected to the motor. The microchip allows to automatically test and control the motor speed, constantly adjusting the speed of vending depending on the type of publication being dispensed. Once the optimum algorithm is developed, the microchip help to minimize and eliminate failure rate of the vending machine. A paper drop sensor is connected to the motor and to the microchip, detecting the vend time for particular type of the publication and sending the data to the microchip for processing. The drop paper sensor is mounted immediately adjacent to the proximal vending edges of the bearing plate assemblies. A drive screw is operationally connected to a motor and to the push plate. A gear assembly is provided to connect the drive screw to the motor. The drive screw is long enough to extend under substantially entire length of the bearing plate, in a channel defined between the bearing plate assemblies.

To prevent unauthorized access to the supply of the newspapers inside the vending machine, the present invention provides for the use of a protecting flap mounted forward of the proximal dispensing edge of the bearing plate assemblies. The flap extends at an angle to the front of the module and covers access from the exterior of the dispensing machine into the dispensing channel.

BRIEF DESCRIPTION OF THE DRAWINGS

Reference will now be made to the drawings, wherein like parts are designated by like numerals, and wherein.

DETAILED DESCRIPTION OF THE PREFERRED EMBODIMENT

Figure 1:
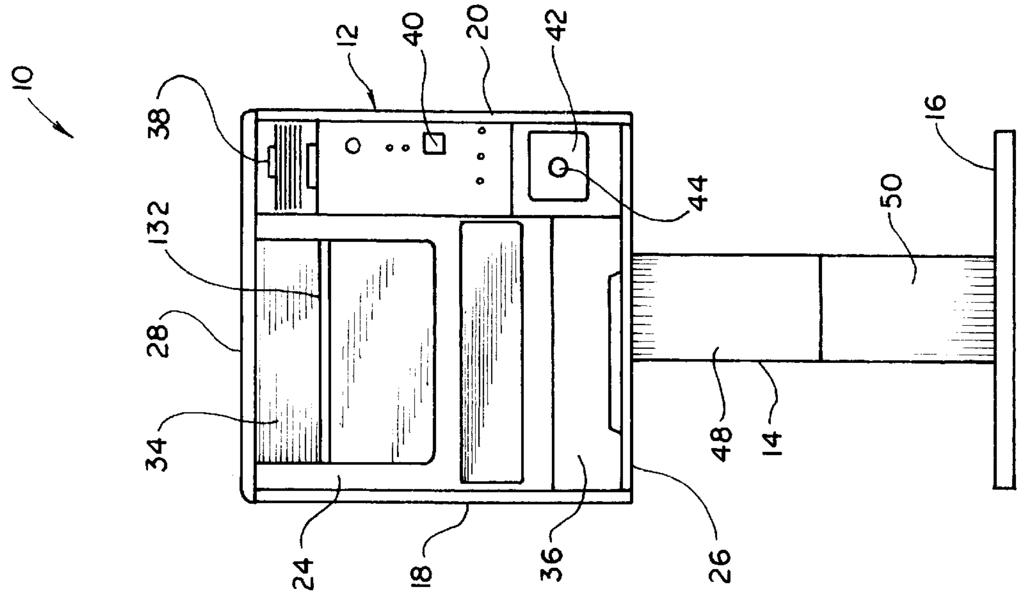
FIG. 1 is a front view of a vending machine in accordance with the present invention.
Figure 4B:
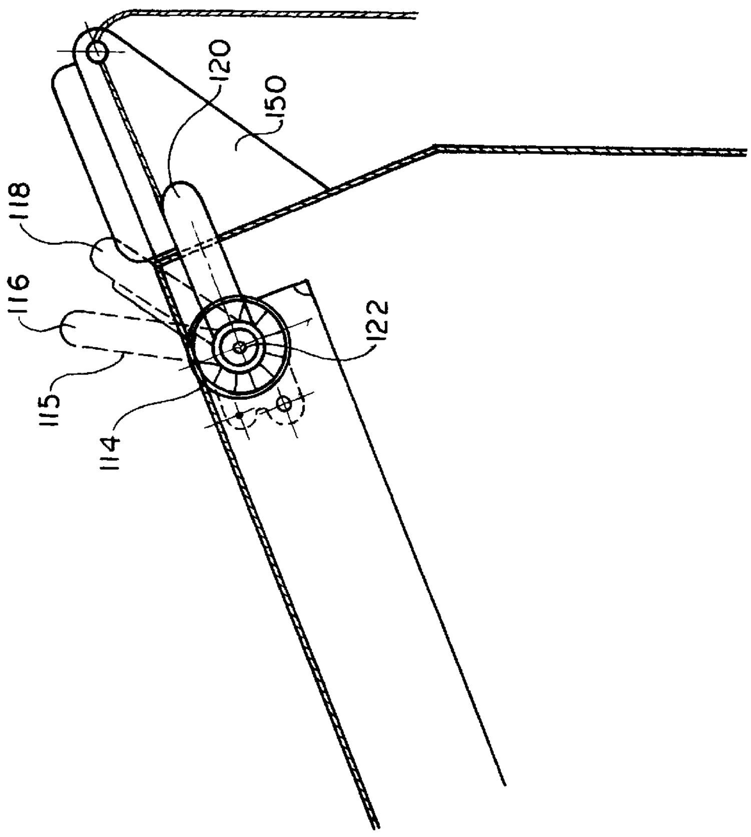
FIG. 4B is a detail view showing a paper drop sensor mounted adjacent to a dispensing edge of the platform.

Turning now to the drawings in more detail, numeral 10 designates the vending machine of the present invention. The vending machine 10 comprises a housing 12 mounted on a pedestal 14 which, in turn, is supported on a base 16. The housing 12 has a pair of side walls 18 and 20, a back wall (not shown), a front wall 24, a bottom 26 and a top 28. The front wall 24 provided with a transparent window 34 to allow the public to read the front page of the publication located in the cabinet.

A lower part of the front wall 24 is provided with a dispensing chute 36 for receiving of the newspaper or magazine dispensed by the vending machine after the appropriate payment has been made by the customer. The front wall 24 is provided with a coin slot 38 where the customer can deposit the coins.

A coin return opening 40 is made below the coin slot 38, as shown in FIG. 1. A case box 42 collects the deposited payment. A keyed access 44 to the case box 42 is provided in a conventional manner. The keyed change box 42 on the front of the machine may be removed from the module housing 12 only by an operator who has a key.

If desired, the top 28 of the housing 12 can be provided with hinges to allow a vendor to open the cabinet and obtain access to the interior of the housing from the front of the unit.

The pedestal 14 is comprised of two telescoping portions 48 and 50 to allow adjustment of the elevation of the coin box and the dispensing opening to various applications, all in compliance with the governmental regulations. The telescopic connection between the pedestal can be adjusted in predetermined increments, allowing to extend or shorten the height of the pedestal, depending on the particular requirements of the location.

Figure 2:
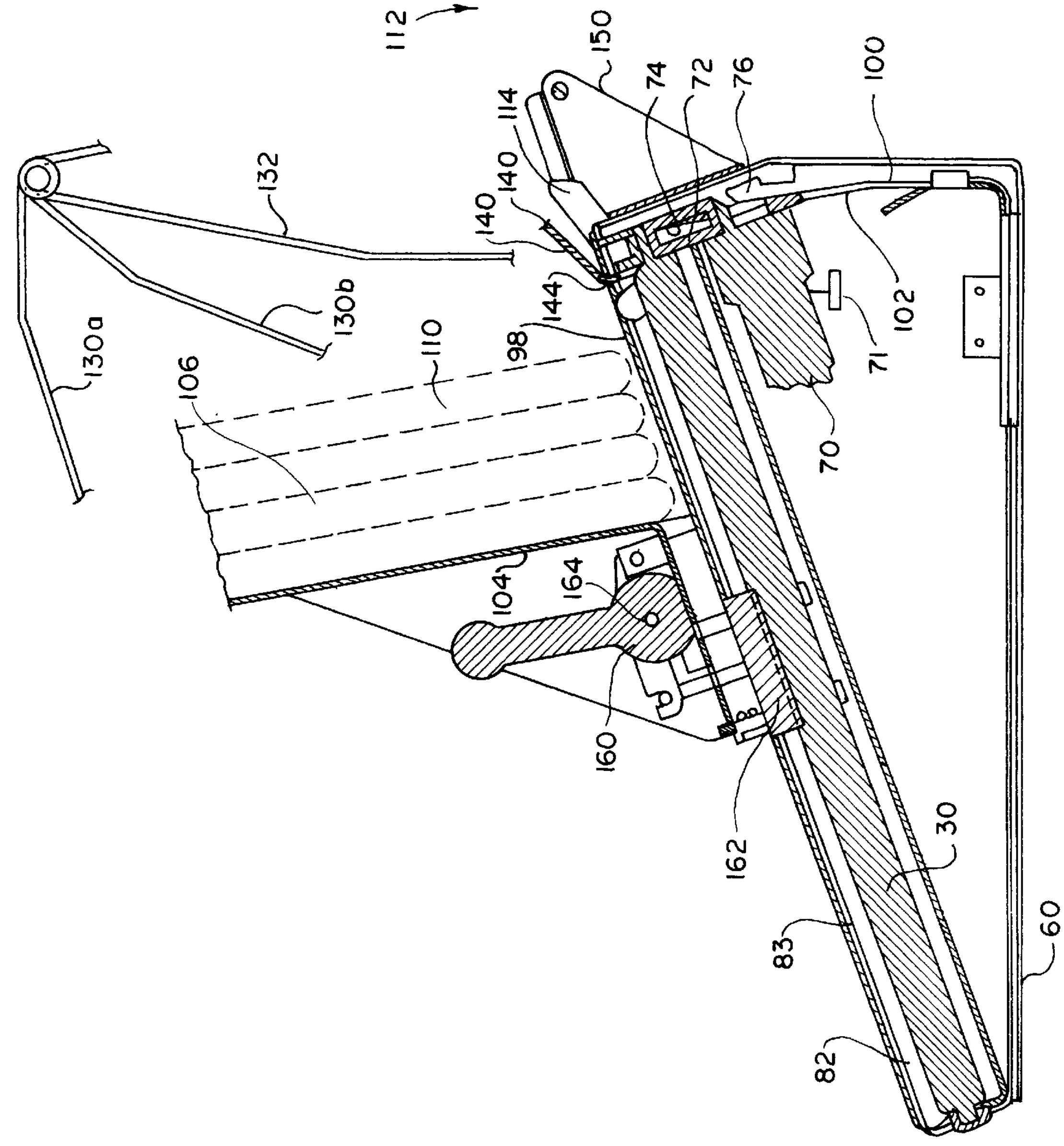
FIG. 2 is a schematic view of the operating mechanism of the dispensing machine in accordance with the present invention.
Figure 3:
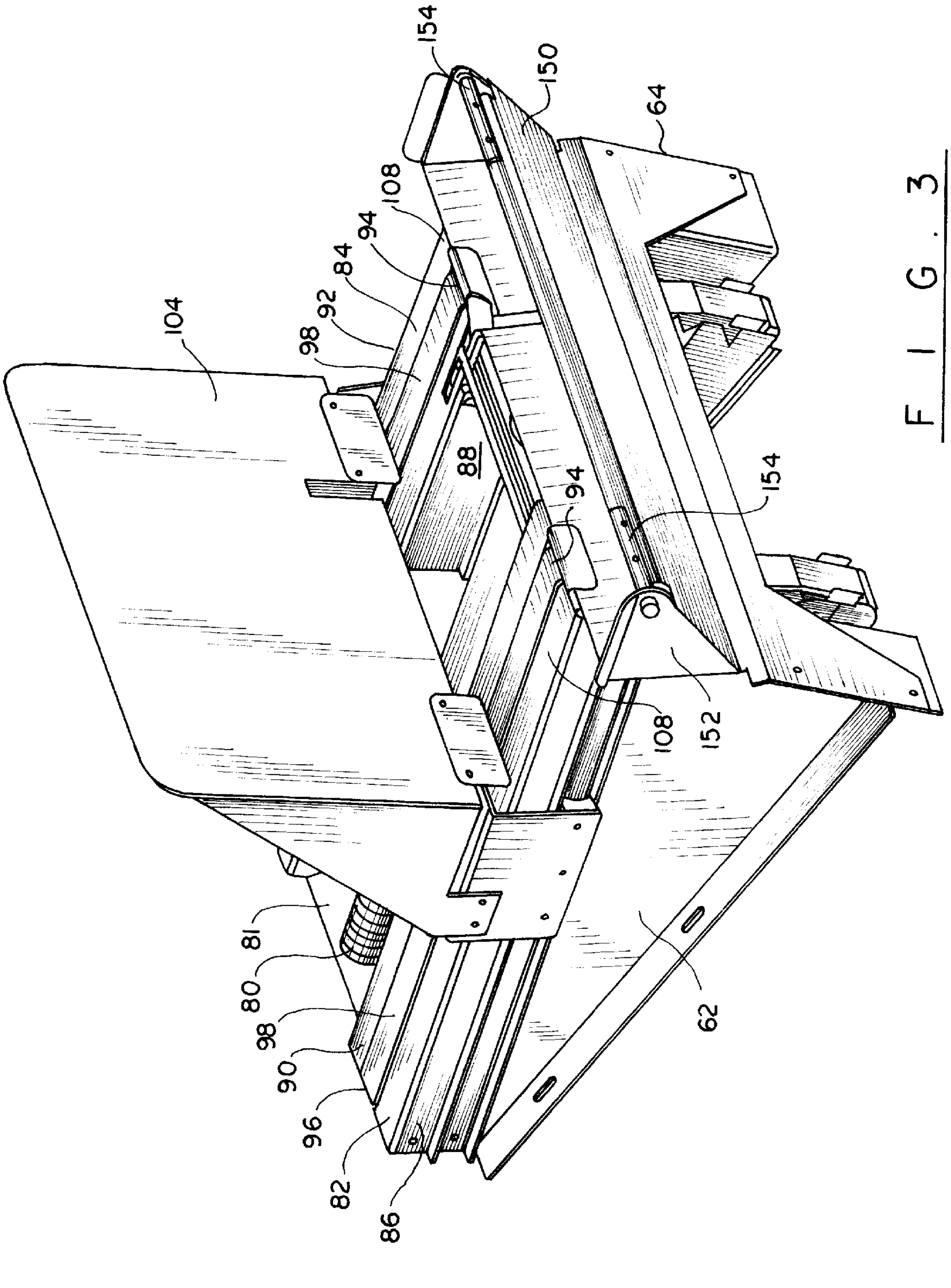
FIG. 3 is a detail view showing a pair of ramp plates and associated belt for supporting newspapers and similar printed publications.

Turning now to FIGS. 2 and 3 of the drawings, the dispensing mechanism of the present invention is shown in more detail. As can be seen in the drawing, the operational portion is positioned on a base plate 60 that extends through substantially entire depth of an inner module. The base plate 60 supports a pair of ramp plates 62 and 64. Secured between the ramp plates 62 and 64 is a motor 70.

The motor 70 is supported on a mount plate 72 adjacent to the front of the unit. The motor 70 has a drive shaft operationally connected to a first spur gear 74 and a second spur gear 76. The spur gear 74 is operationally connected to threaded rod that acts as a lead, or drive screw 80. When the motor 70 is activated, rotation is transmitted through the drive shaft 72 to the gears, 74, 76 and to the lead screw 80.

A microchip device 71 is mounted in operational connection with the motor 70 inside the module. The microchip device 71 allows to control speed with which the motor 70 pushes newspapers up the ramp and automatically adjust the sped depending on the paper thickness. For example, if the speed is too low and paper is relatively thick—it takes too long to vend such paper.

Therefore, when the first paper is vended, a clock in the microchip device 71 detects the speed of vending and sends the signal to the motor to adjust the speed of vending of the next paper based on the data supplied by the microchip. The microchip 71 constantly corrects and updates the desired speed of movement based on the paper thickness. The optimum vend time is determined, and the range between thin and thick paper dispensing time becomes the standard. Usually, a cycle starts with the microchip disabling interrupt modes, initializing registers and variables and testing battery voltage. If the battery is low, the microchip turns on low battery LED. If the battery is fully energized the low battery LED is turned off. Then the motor speed control sensors are turned on. The sensors, in one of the preferred embodiments, are Hall effect sensors.

After a pre-determined initial delay, for example 10 msec a daily "expired" flag is tested and a vending cycle test is implemented. If during the test low energy levels are detected the motor and the Hall effect sensors are turned off. The inhibit coins output is turned off, and test vend request input is put in. The disable mode is interrupted and the microcontroller is put in a stop mode.

To set the motor for the optimum vend time the microchip tests for the end of travel, for paper presence and turns on the motor. The clock in the microchip 71 stop the motor when the end of travel is reached and the motor speed is set to minimum, which is usually vend time for Sunday newspaper. A similar test is performed for minimum vend time and maximum motor speed which is usually detected for daily newspaper vending. Once these parameters are established, the clock is stopped, the motor is turned off and the algorithm is determined, providing foe an initial delay time of about 500 msec.

Mounted above the lead screw 80 is a pair of bearing plate assemblies 82 and 84 that support a push plate 104 movable along the bearing plate assemblies 82 and 84 in response to rotation of the lead screw 80. The push plate 104 is oriented at an approximately right angle to the bearing plate assemblies 82 and 84 for retaining the printed publications in a generally upright position, with folded edge of the publication sliding along the bearing plate assemblies 82 and 84. The lead screw 80 extends along substantially entire length of the bearing plate assemblies 82 and 84 in order to maximize the space available within the module vending machine, while reducing loads on the motor 70.

Each bearing plate assembly 82 and 84 is comprised of a pair of inverted U-shaped members with an outer side wall 86, an inner side wall 88 and top surfaces 90 and 92, respectively. The two-part construction of the bearing plate assembly simplifies manufacture and gives access to the lead screw 80 from the top of the operating mechanism. The individual walls may be formed from bent metal sheets, if desired.

The drive screw 80 is positioned in a space between the parallel inner side walls 88, in its own channel guide 81. Of course, if desired, the bearing plate may be constructed as a solid plate, substantially covering the lead screw 80.

The top surfaces of the bearing plate assemblies each have transverse slots 94 adjacent a front portion of the bearing plate assembly and transverse slots 96 (only one shown in FIG. 3) adjacent to the back portion of the bearing plate assembly.

An endless traction belt 98 is provided for each of the bearing plate assemblies for movement up the inclined surfaces 90 and 92. The belts 98 pass through the slots 94 and 96, extending below the drive screw 80, as shown in FIG. 2. Each belt 98 has a high friction exterior surface 100 and a low friction interior surface 102. The belts 98 are driven by the motor 80 through gear and pulley arrangement in a manner known to those skilled in the art.

A push plate 104 supports publications 106 (shown in phantom lines in FIG. 2) as they are transported by the belts 98 to the proximal edge 108 of the bearing plates 82 and 83, where the forwardmost copy 110 of the publications is dispensed after the payment has been received in the vending machine. The copy 110 drops, by gravity, into a dispensing channel 112. The push plate 104 is attached to the belts 98 and moves with the belts advancing the publications along the bearing plate assemblies 82 and 83.

Figure 4:
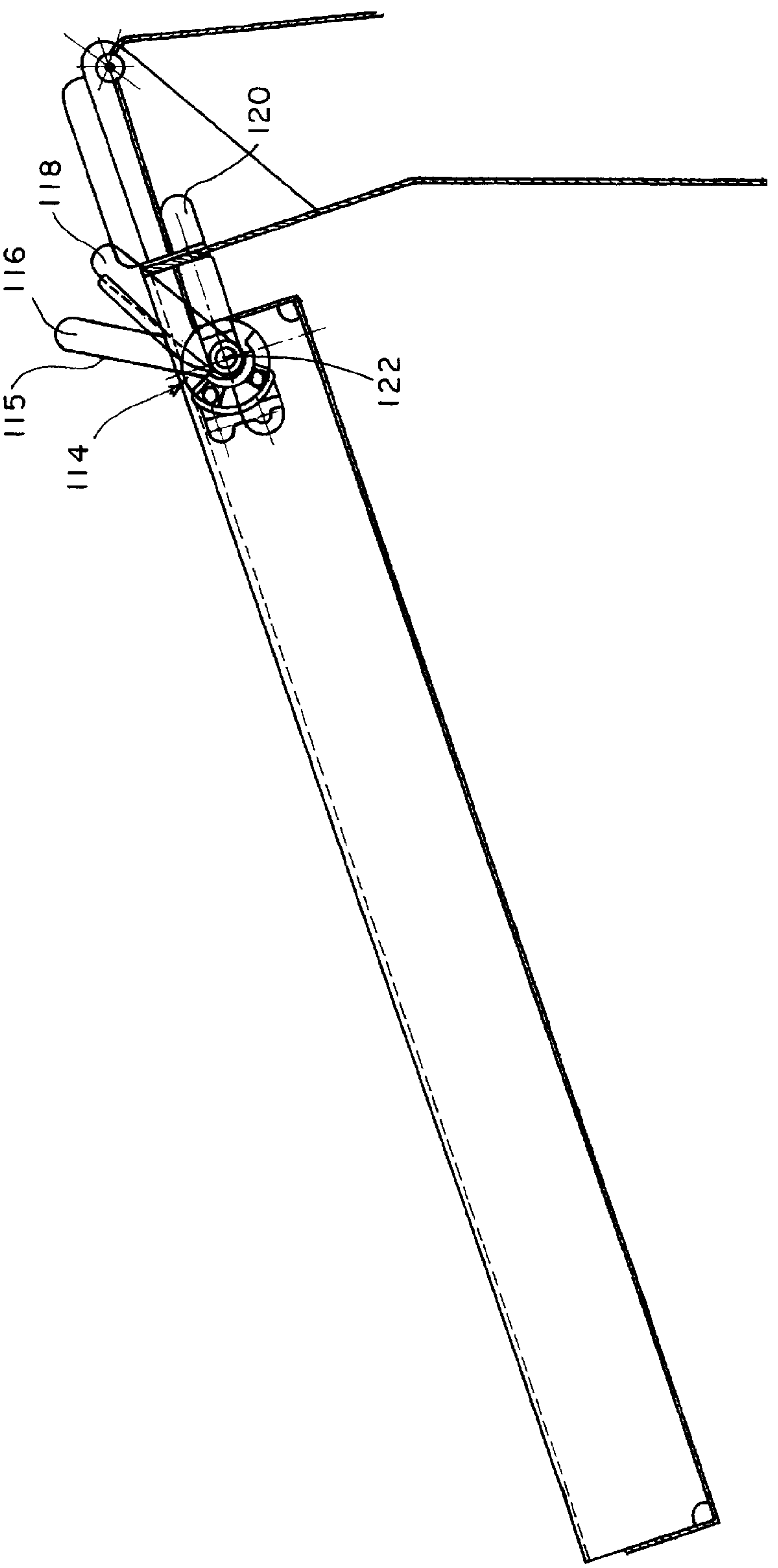
FIG. 4 is a detail view showing a paper drop sensor mounted adjacent to a dispensing edge of the platform.

A paper drop sensor 114 is secured adjacent to the proximal edge 108. A sensor arm 115 moves between a first position (shown by numeral 116 in FIG. 4), when no paper contact is present, to a second position (shown by numeral 118 in FIG. 4), when the paper moves across the sensor, and a third position (shown by numeral 120 in FIG. 4) when the paper drops into the dispensing channel 112.

The sensor arm 115 pivots approximately 60 degrees about an axis 122 of a shaft that is operationally connected to the motor 70. Once a newspaper is dispensed a signal is sent from the sensor 114 to stop rotation of the drive shaft 80. The sensor 114 is operationally connected to the microchip 71 to provide data for determining the optimum dispensing time.

Mounted in the housing 12 above the bearing plate assemblies 82 and 83 is a pair of paper pressure springs 130 and 132. The pressure springs 130 and 132 prevent the newspapers from opening at the fold and jamming in the dispensing channel 112.

The torsion spring 130 and 132 have a generally U-shaped configuration, extending transversely to the front end of the module and transversely across the front of a newspaper or other publication when in use. The torsion spring 132 is longer and extends across the paper path during vending of weekday or Sunday newspapers. It is designed to exert a predetermined amount of pressure on a front face of the forwardmost paper 110 and prevent the paper from premature opening.

The torsion spring 130 is normally in its first position designed as 130a in FIG. 2. In that position, it is outside of the paper path when thin weekday papers are dispensed. When Sunday or special addition papers are vended the spring 130 is pivoted down into a position designated by 130*b* in FIG. 2. The angle of movement between a first and second position is about 50 degrees. The auxiliary spring 130 applies greater pressure to the paper front face helping keep the thick newspaper in a generally folded configuration as it moves into the dispensing channel 112.

A metering brake 140 with an upwardly inclined upper surface extends upwardly above the channel 81 between the top surfaces 90 and 92 of the bearing plate assemblies 82 and 84. The metering brake member 140 in this embodiment is a solid block with a front edge 142 being higher than the distant edge 144. The degree of incline of the metering brake 140 may be 17 degrees, with the push plate 104 being oriented at about 100 degrees.

If desired, the top surface of the metering brake 140 can be roughened to increase friction of the publication when it moves along the metering brake 140 into the dispensing channel 112. Tests demonstrated that such material as nylon was particularly advantageous when used for the body of the metering brake 140.

To prevent unauthorized access to the newspapers 106 a protective flap 150 is position across the front of the module in the dispensing channel 112. The flap 150 is secured on an opposing pair of brackets 152 and securing rods 154 attached to the brackets 152. The flap 150 effectively prevents an unauthorized person from reaching inside the dispensing machine and removing newspapers therefrom.

A clutch mechanism 160 secures a drive nut 162 to the lead screw 80. The clutch mechanism pivots about an axis 164. When the clutch mechanism is in a position shown in FIG. 2 it presses against the drive nut 162 and causes the nut 162 to engage the drive screw 80. After the last publication is dispensed or when the vendor needs to replenish supply of newspapers the push plate 104 must be moved back to the starting position down the ramp. In order to save power and simplify the operation of the vending machine 10, the clutch 160 is pivoted to release the nut 162 and disengage the nut 162 from the drive screw 80. Then the vendor can move the push plate back and place a new supply of the publications ready for vending. The clutch 160 is then returned to its original position, with the nut 162 engaging the lead screw 80.

Similarly, when an operator desires to position only a limited number of publications, the push plate 104 can be moved half way along the bearing plates 82 and 84 and the lead screw 80, thereby supporting the publications 86 at any desired location along the bearing plate 82. The clutch mechanism may be used in a manner described above to permit such an operation.

To simplify manufacture, the lead screw 80 may be carried by the same mounting plate 72 as the motor 70. The fact that the push plate 104 can be manually repositioned to the start of the vending cycle or anywhere in between allows to save electricity and avoid drain on the battery.

If desired, a solar panel can be incorporated into the front door of the housing 12 to continue to recharge the battery and thereby extend the lifetime of the motor. The push plate 104 is made relatively short, smaller than the height of the publication in order to minimize the loads on the motor in advancing the push plate along the bearing plates 82 and 84. If desired, the bearing plate and the dispensing chute can be made as one piece, allowing the newspaper 106 to smoothly fall down the dispensing channel 112.

During tests, the vending machine 10 demonstrated a high rate of no-failure dispensing, in the order of 94–100%. It was observed that high motor speed increases the chances of vend failure, with the tension springs 130 and 132 substantially increasing a successful vend rate. For example, tests demonstrated that a motor speed of about 75–77 rpm provided good results.

Many other changes and modifications can be made in the design of the present invention without departing from the spirit thereof. We, therefore, pray that our rights to the present invention be limited only by the scope of the appended claims.

I claim:

1. A dispensing machine for printed publications, comprising:

at least one bearing plate assembly for supporting a plurality of printed publications in an upright position;

a variable speed motor means comprising a means for controlling speed of the motor means depending on thickness of a publication being dispensed;

a moving belt assembly operationally connected to said motor means for advancing printed publications toward a proximal dispensing edge of said at least one bearing plate assembly;

a push plate slidably movable along said at least one bearing plate assembly, said push plate forming an upright support for said printed publications; and a stationary means for separating a single forward copy of the publication for dispensing mounted adjacent to the proximal dispensing edge of said at least one bearing plate assembly.

2. The apparatus of claim 1, further comprising a means for detecting movement of a publication being dispensed into a dispensing channel and sending a signal of paper speed movement to a clock operationally connected to said means for controlling speed of the motor means.

3. The apparatus of claim 2, wherein said detecting means comprises a pivotal arm mounted adjacent to the proximal dispensing edge of said at least one bearing plate assembly, said pivotal arm being operationally connected to said motor means to stop operation of the motor once a publication has been dispensed.

4. The apparatus of claim 1, further comprising a means for supporting a front face of the forwardmost publication resting on said at least one bearing plate assembly.

5. The apparatus of claim 4, wherein said supporting means comprises at least one torsion spring mounted transversely to said front face of the forwardmost publication, said torsion spring preventing premature opening of said forwardmost publication during dispensing.

6. The apparatus of claim 4, wherein said supporting means comprises a first torsion spring extending across the front face of the publication directly in a normal paper path and a second pivotal torsion spring normally extending outside of the normal paper path, said second torsion spring being moved into the normal paper path for engaging a front face of a voluminous publication.

7. The apparatus of claim 1, wherein said at least one bearing plate assembly comprises a pair of spaced-apart members, and wherein a channel is formed between said bearing plate members.

8. The apparatus of claim 7, wherein each of said bearing plate members is provided with an endless moving belt.

9. The apparatus of claim 8, wherein a drive screw is mounted in said channel, said drive screw being operationally connected to each of said endless moving belts and to a motor for advancing said printed publications along said bearing plate members.

10. The apparatus of claim 1, wherein said means for separating a single copy of the printed publication comprises a stationary metering break member attached to said at least one bearing plate assembly, said metering break member having an upwardly inclined upper surface which extends above said at least one bearing plate assembly.

11. The apparatus of claim 9, wherein said drive screw extends along substantially entire length of said bearing plate members.

12. A dispensing machine for printed publications, comprising:

a hollow housing provided with a dispensing channel;

at least one bearing plate assembly for supporting a plurality of printed publications in an upright position;

a variable speed motor means comprising a means for controlling speed of the motor means depending on thickness of a publication being dispensed;

a moving belt assembly operationally connected to said motor means for advancing printed publications toward the dispensing channel;

a push plate slidably movable along said at least one bearing plate assembly, said push plate forming an upright support for said printed publications;

a means for detecting movement of a publication being dispensed into the dispensing channel and sending a signal of paper speed movement to a clock operationally connected to said means for controlling speed of the motor means; and a stationary means for separating a single forward copy of the publication for dispensing attached to a proximal dispensing edge of said at least one bearing plate assembly.

13. The apparatus of claim 12, further comprising a means for supporting a front face of the forwardmost publication resting on said at least one bearing plate assembly.

14. The apparatus of claim 13, wherein said supporting means comprises at least one torsion spring mounted transversely to said front face of the forwardmost publication, said torsion spring preventing premature opening of said forwardmost publication during dispensing.

15. The apparatus of claim 13, wherein said supporting means comprises a first torsion spring extending across the front face of the publication directly in a normal paper path and a second pivotal torsion spring normally extending outside of the normal paper path, said second torsion spring being moved into the normal paper path for engaging a front face of a voluminous publication.

16. The apparatus of claim 12, wherein said at least one bearing plate assembly comprises a pair of spaced-apart members, and wherein a channel is formed between said bearing plate members.

17. The apparatus of claim 16, wherein each of said bearing plate members is provided with an endless moving belt.

18. The apparatus of claim 12, wherein said means for separating a single copy of the printed publication comprises a stationary metering break member attached to said at least one bearing plate assembly, said metering break member having an upwardly inclined upper surface which extends above said at least one bearing plate assembly.

19. A dispensing machine for printed publications, comprising:

a hollow housing provided with a dispensing channel;

at least one bearing plate assembly for supporting a plurality of printed publications in an upright position;

a variable speed motor means comprising a means for controlling speed of the motor means depending on thickness of a publication being dispensed;

a moving belt assembly operationally connected to said motor means for advancing printed publications toward the dispensing channel;

a push plate slidably movable along said at least one bearing plate assembly, said push plate forming an upright support for said printed publications;

a means for detecting movement of a publication being dispensed into the dispensing channel and sending a signal of paper speed movement to a clock operationally connected to said means for controlling speed of the motor means;

a means for supporting a front face of the forwardmost publication resting on said at least one bearing plate assembly; and a stationary means for separating a single forward copy of the publication for dispensing attached to a proximal dispensing edge of said at least one bearing plate assembly.

20. The apparatus of claim 19, wherein said supporting means comprises a first torsion spring extending across the front face of the publication directly in a normal paper path and a second pivotal torsion spring normally extending outside of the normal paper path, said second torsion spring being moved into the normal paper path for engaging a front face of a voluminous publication.

* * * * *